J. SUTTER.
Wheel Plow.

No. 17,591. Patented June 16, 1857.

Witnesses:

Inventor:

UNITED STATES PATENT OFFICE.

JOSEPH SUTTER, OF ST. LOUIS COUNTY, MISSOURI.

IMPROVEMENT IN GANG-PLOWS.

Specification forming part of Letters Patent No. 17,591, dated June 16, 1857.

*To all whom it may concern:*

Be it known that I, JOSEPH SUTTER, of the county of St. Louis, and State of Missouri, have invented a new and Improved Gang-Plow; and I do hereby declare that the following is a full, clear, and exact description of the same, reference being had to the annexed drawings, making a part of this specification, in which—

Figure 1:
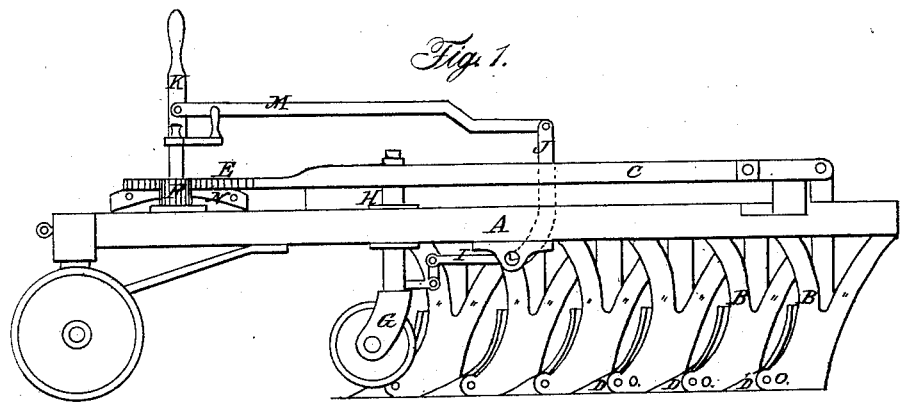
Figure 2:
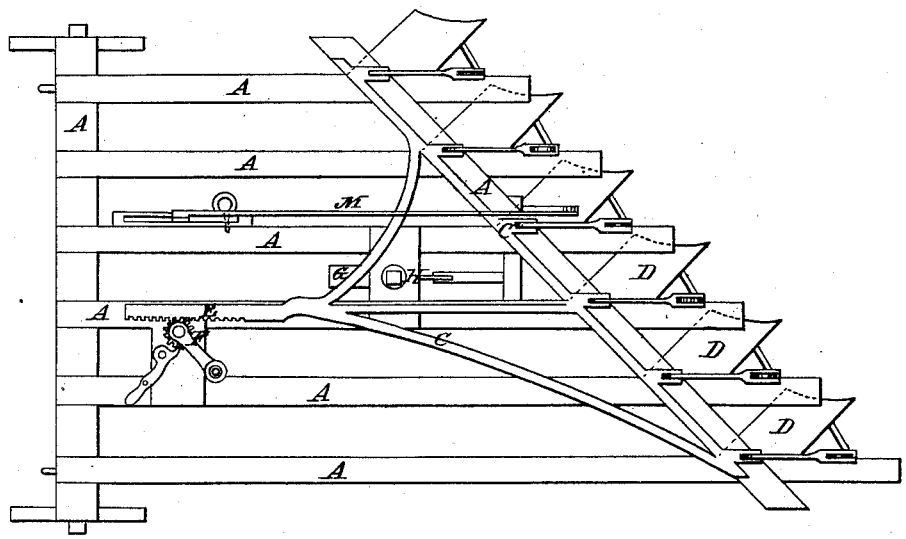

Figure 1 is a longitudinal elevation, and Fig. 2 is a plan.

The nature of my invention consists in placing on a quadrangular frame a series of plows, each one of which is to be supported on a pivot in its landside, so as to vibrate freely, and to be so connected and arranged that the plowman can regulate their dip with facility.

The construction and operation of my plow are as follows:

A A A, &c., are the beams constituting the quadrangular wooden frame, to which is secured the iron frame B. In the frame B the pivot O is placed, and upon it the plow is supported. On the frame A is placed the framework C, which is connected to the plows D D D by means of links and levers, the levers being in fact a part of the plows themselves. The drawings show the plan of their attachments. A continuation of the frame-work C is made to form a rack at E, into which the pinion F works.

The caster G is designed to lift the plow from the ground, so that it may be transported from place to place, and is made to work freely in a socket, (shown at H,) and is controlled in its vertical motion by the levers I, J, and K. These levers are connected by means of the rock-shaft L and the link M. The caster is made to revolve freely, so that the plow can be turned in any direction. The lever K is kept in position by pins in the segment N.

When it is desired to put the plow in operation the plowman throws the lever K back, so as to raise the caster and let the plow fall on the ground. Then by turning the pinion F so as to throw the rack forward the points of the plows are made to dip and enter the ground to any desired depth, and by turning the pinion in an opposite direction the points of the plows are elevated, so as to emerge from the ground without further effort on the part of the plowman.

What I claim as my invention, and desire to secure by Letters Patent, is—

The combination of plows D with frame B and pivot O, arranged and operated in the manner and for the purpose herein set forth.

JOSEPH SUTTER.

Witnesses:
AMOS BROADNAX,
WM. F. HOLOPE.